This invention pertains to the vaporization of predetermined small quantities of liquid metal, particularly for use in devices to produce thrust by ejection of vapors or gases at high velocity.

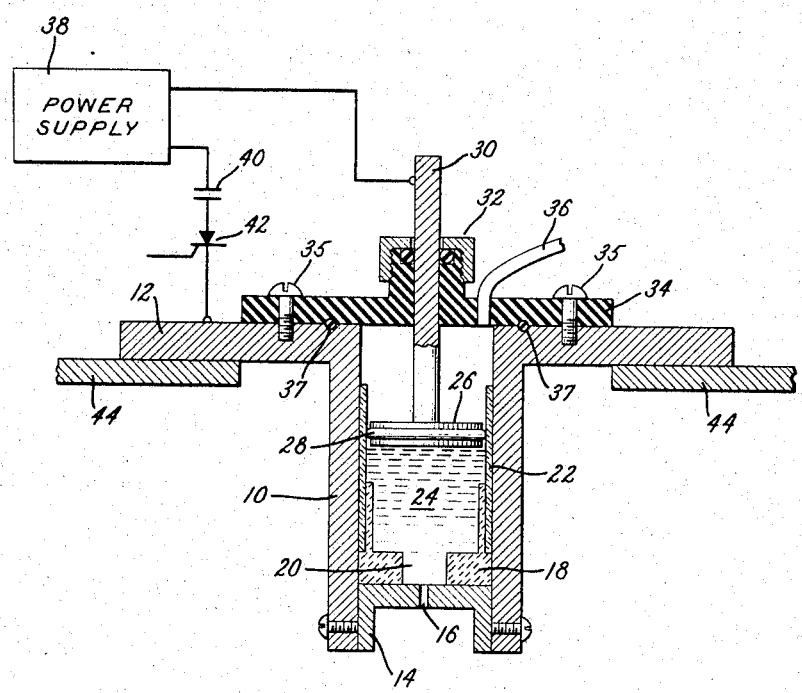
INVENTORS:
HAROLD E. HALL,
THOMAS W. KARRAS,
BY Henry W. Kaufman
AGENT 3,350,885
FLUID METAL VAPORIZER
Harold E. Hall, King of Prussia, and Thomas W. Karras, Devon, Pa., assignors to General Electric Company, a corporation of New York
Filed Mar. 8, 1966, Ser. No. 532,737
2 Claims. (Cl. 60—203)

It is taught in detail in United States Patent No. 3,151,259 how it is useful to impart velocity to small amounts of vapor or gas working substance to produce thrust e.g. upon a space vehicle. It is desirable to control the release of working substance by the simplest possible means, employing only the simplest (and thus most reliable) valves, or avoiding the use of valves entirely. We have invented a device by which a liquid metal, such as mercury, may be vaporized by simple low-voltage electrical means in a metered quantity determined largely by the dimensions of the apparatus; and the supply of liquid metal may be maintained under slight pressure to insure its continued availability but be prevented by surface tension from flowing out of the device in the liquid state.

Thus we achieve the desirable object of providing means without moving parts which can retain liquid metal and controllably produce predetermined quantities of the vapor of the metal; this achievement implies reliability of operation, long life, and economy, as well as other logical derivatives of these.

For the better understanding of our invention we have provided a figure of drawing in which 10 represents in section a cylinder which may be of stainless steel having a flanged base 12. In the end of 10 remote from the base 12 there is represented also in section a plug 14 of metal, which may conveniently be stainless steel, provided with a hole 16 which in a particular embodiment was 0.0007 inch in diameter. Resting against plug 14 there was provided an electrically insulating plug 18 which may conveniently be of a machinable ceramic, provided with a central metering hole 20 which was 0.0025 inch in diameter and 0.015 inch long. Extensions of insulating plug 18 extended as represented inside of glass tube 22 which extended upward in the figure along the walls of cylinder 10, serving to insulate from the walls of cylinder 10 a liquid metal 24, which in the embodiment actually constructed was mercury. A piston 26 of metal, which in the embodiment described was stainless steel, was provided with an O-ring 28 to form a tight seal with the inside walls of tube 22. Integral with piston 26 was piston rod 30, of the same material, which extended through a stuffing box or gland 32 which was a part of a flange 34 which was rigidly held to flange 12 by insulating screws 35. A tube 36 extended through flange 34 and connected to the interior of cylinder 10 in order to permit evacuation or pressurization of the interspace for reasons to be described hereinafter, the space between flanges 12 and 34 being sealed by an O-ring 37.

A power supply 38 was connected as represented to piston rod 30 and, through a capacitor 40 (which in the embodiment described had a capacitance of 0.5 mfd.) and a silicon controlled rectifier 42, to flange 12. The connection of flange 12 with plug 14 caused an electrical circuit to exist to the liquid metal 24 in the metering chamber 20.

The flange 12 was rigidly fastened and sealed by an O-ring to an opening in an evacuated chamber 44, which is shown only schematically and in part, since evacuable chambers are well known.

In the operation of the embodiment described, which is typical, the piston 26 was first withdrawn by elevation of rod 30 through stuffing box 32 so the O-ring 28 was withdrawn from glass tube 22. By evacuation through tube 36, by standard vacuum means well known and therefore not represented, the gas above liquid metal 24 was removed. The chamber 44 in which the entire assembly was installed was evacuated to approximately the same pressure, so that no extremely high pressure differential would exist to force the mercury through aperture 16. After chamber 44 and the interior of cylinder 10 had been evacuated, piston 26 was lowered to the surface of liquid metal 24, O-ring 28 being thereby moved inside tube 22, and a pressure of a gas of one atmosphere was applied through tube 26 to produce pressure on piston 26 which pressure was transmitted to the liquid metal 24. When power supply 28 was adjusted to give a potential of approximately 170 volts, and silicon controlled rectifier 42 was triggered, by conventional means not shown, to cause a charge from capacitor 40 to flow through it, a discharge of mercury vapor was observed in the vicinity of capillary 16 by a small ionization gauge located in vacuum chamber 44; and, when the silicon control rectifier 42 had been triggered a number of times and vacuum chamber 44 was filled with air and opened and examined, condensed mercury vapor droplets were found in it.

It was found that if no pressure were applied to the liquid metal 24 by piston 26, only one discharge occurred. This is consistent with metering chamber 20 having been emptied of mercury by vaporization from the first discharge and, because of its own small diameter and the high surface tension of mercury, not receiving an influx of more mercury. It will be observed that the large diameter (.408 inch) of cylinder 10 compared with the diameter of chamber 20 would cause the mass of liquid metal between piston 26 and the entrance to chamber 20 to be of a very much larger cross-section and thus a much smaller resistance than the mass of metal in chamber 20. Consequently, when the vaporizing discharge occurred most of the energy would be dissipated in the metered amount of liquid metal contained in chamber 20. It was observed that the calculated energy required to vaporize the mercury contained in chamber 20 was approximately 5.5 millijoules, and the amount actually required ranged from 5.5 to 7.2 millijoules. The higher value is considered to be preferred in order that small voltage variations may not cause failure, since it appears that an amount insufficient to vaporize all the liquid metal contained in chamber 20 produces a negligible amount of vapor. The very small diameter capillary 16 requires so much pressure to force liquid mercury into it, that pressure ample to cause the liquid metal 24 to fill metering chamber 20 and force the mercury into contact with plug 14 is not sufficient to force the liquid metal through capillary 16. However, the vaporized metal is able to move freely through the capillary, so that when the metered amount is vaporized in chamber 20 by electrical discharge as described, the vapor exits through capillary 16 and the existing pressure from piston 26 causing the liquid metal to refill chamber 20, ready for another discharge, but does not force liquid metal out of cylinder 10.

It is, of course, apparent that a variety of geometries may be used, and that a variety of electrical circuits may be employed to perform the functions which we have taught. While mercury is a more convenient metal because it is a fluid at ordinary temperatures, by the use of suitable precautions other fluid metals, such as alkali metals, may be employed.

It is also apparent that our invention may be used to provide small amounts of thrust directly without augmentation (since the expulsion of the vaporized metal necessarily imparts momentum to it, with a resulting thrust on the apparatus); or the device may be used for producing metered doses of metal vapor for other purposes, including the controlled provision of working fluid to electrical or other type of vapor or plasma accelerators.

We claim:
1. A controllable metering source of vapor of a metal stored in a liquid condition comprising:
   (1) a storage chamber for containing a bulk store of liquid metal;
   (2) pressure means connected to the storage chamber for maintaining pressure in liquid metal stored therein;
   (3) a metering chamber connected to the storage chamber for receiving under pressure a volume of liquid metal to be vaporized;
   (4) capillary exit means leading from the metering chamber, sufficiently narrow to restrain by virtue of surface tension from passage therethrough liquid metal from the storage chamber, under pressure provided by said pressure means;
   (5) controllable electrical energy means for applying electrical energy to liquid metal stored in the said storage chamber to vaporize the same and expel it through the capillary exit means.
2. A device as claimed in claim 1, in which:
   (6) the therein said capillary exit means comprises a first electrical connection to the therein said controllable electrical energy means, and
   (7) the therein said metering chamber is connected with a second electrical connection to the therein said controllable electrical energy means.

References Cited

UNITED STATES PATENTS

| | | | |
|---|---|---|---|
| 2,493,073 | 1/1950 | Kinneen | 219—275 |
| 2,621,281 | 12/1952 | Runkle | 219—285 |
| 3,185,106 | 5/1965 | Smith | 103—255 |
| 3,233,404 | 2/1966 | Huber et al. | 60—202 |
| 3,279,177 | 10/1966 | Ducati | 60—203 |

CARLTON R. CROYLE, *Primary Examiner.*